United States Patent

[11] 3,630,452

| [72] | Inventor | William Thomas Monaghan<br>Sandiacre, Nottingham, England |
|---|---|---|
| [21] | Appl. No. | 856,942 |
| [22] | Filed | Sept. 11, 1969 |
| [45] | Patented | Dec. 28, 1971 |
| [73] | Assignee | Rolls Royce Limited<br>Derby, England |
| [32] | Priority | Sept. 14, 1968 |
| [33] | | Great Britain |
| [31] | | 43,830/68 |

[54] VARIABLE-AREA EXHAUST NOZZLES FOR GAS TURBINE ENGINES
1 Claim, 2 Drawing Figs.

[52] U.S. Cl. ................................................ 239/265.39
[51] Int. Cl. .................................................. B64c 15/06
[50] Field of Search .......................... 239/265.39, 265.37, 265.33

[56] References Cited
UNITED STATES PATENTS

| 2,693,078 | 11/1954 | Laucher | 239/265.39 |
| 2,815,643 | 12/1957 | Geary et al. | 239/265.39 |
| 2,927,424 | 3/1960 | Hyde | 239/265.39 |
| 2,976,676 | 3/1961 | Kress | 239/265.39 |
| 2,984,068 | 5/1961 | Eatock | 239/265.39 |
| 3,049,875 | 8/1962 | Horgan | 239/265.39 |
| 3,302,889 | 2/1967 | Sabato | 239/265.39 X |
| 3,441,221 | 4/1969 | Naud et al. | 239/265.39 X |

FOREIGN PATENTS

| 1,199,372 | 12/1959 | France | 239/265.39 |

Primary Examiner—M. Henson Wood, Jr.
Assistant Examiner—John J. Love
Attorney—Cushman, Darby & Cushman ABSTRACT: In a gas turbine engine, a variable-area exhaust nozzle is provided and consists of a plurality of flaps arranged in side-by-side sealing relationship with each other; each flap is hinged about the circumference of the downstream end of the engine in axially overlapping relationship therewith so as to permit rocking of the flaps such that their ends move about the axis of their respective hinges, cam means being provided to effect such rocking; the flaps are mounted so that their respective surfaces will form substantially continuous inner and outer flow surfaces.

Patented Dec. 28, 1971

3,630,452

Inventor
WILLIAM THOMAS MONAGHAN

By Cushman, Darby & Cushman
Attorneys

VARIABLE-AREA EXHAUST NOZZLES FOR GAS TURBINE ENGINES

This invention concerns variable-area exhaust nozzles for gas turbine engines.

According to the present invention there is provided a gas turbine engine variable-area exhaust nozzle comprising a plurality of flaps arranged in side-by-side sealing relationship with each other and adapted to be hinged to fixed structure in axially overlapping relationship therewith so as to permit rocking of the flaps such that their ends move about the axis of their respective hinges and means for causing said rocking.

Preferably the flaps are hinged to the downstream end of the fixed structure, that is, downstream with respect to the direct of flow of the exhaust gases through the structure and nozzle.

The fixed structure may be a jet pipe, the flaps being hinged to the downstream end thereof.

Alternatively, the fixed structure may comprise a pod within which a gas turbine engine is to be mounted, the flaps being hinged to the downstream end of the pod.

A further alternative fixed structure may comprise an aircraft fuselage, wherein a gas turbine engine is to be mounted, the flaps being hinged to the downstream end of said fuselage.

Preferably, the flaps are hinged substantially centrally of their axial lengths.

Preferably the means for causing said rocking of the flaps in at least one direction comprises cams having surfaces which are caused to act on the upstream ends of the flaps so as to produce a moment of force whereby to rock the flaps.

Preferably, though not restrictively, the means for causing the rocking of the flaps in at least one direction comprises the reaction of the exhaust gases on the end of the flaps downstream of the hinges.

Preferably the cams are mounted for translation to enable them to act on the flaps.

Preferably rollers or the like are rotatably mounted on the upstream ends of the flaps so as to initially receive the loads exerted by the cams on the flaps and so reduce friction therebetween.

Preferably the cams are translated by powered rams or solenoids or the like.

The invention will now be described with reference to the accompanying drawings in which.

Figure 1:
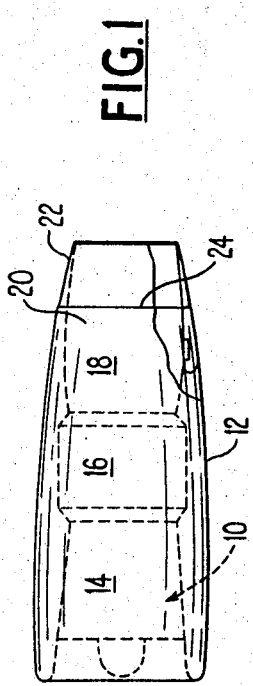
FIG. 1 is a diagrammatic view of a gas turbine engine mounted in a pod.

In FIG. 1 gas turbine engine 10 indicated by dotted lines, is encased within the fixed structure which forms a streamlined pod 12. Pod 12 would in use, be rigidly mounted externally of an aircraft (not shown) on or adjacent its fuselage or a wing.

The gas turbine engine shown is a conventional one comprising compressor 14, combustion equipment 16, an expansion turbine 18 and a jet pipe 20, all in flow series. Jet pipe 20 terminates in a variable-area nozzle which comprises a plurality of flaps one of which is shown at 22 and this nozzle projects beyond the downstream extremity 24 of pod 12. However, it will be appreciated that the invention can be applied to bypass gas turbine engines, gas turbine engines with reheat equipment, gas turbine engines with reverser equipment and/or any combination thereof.

Figure 2:
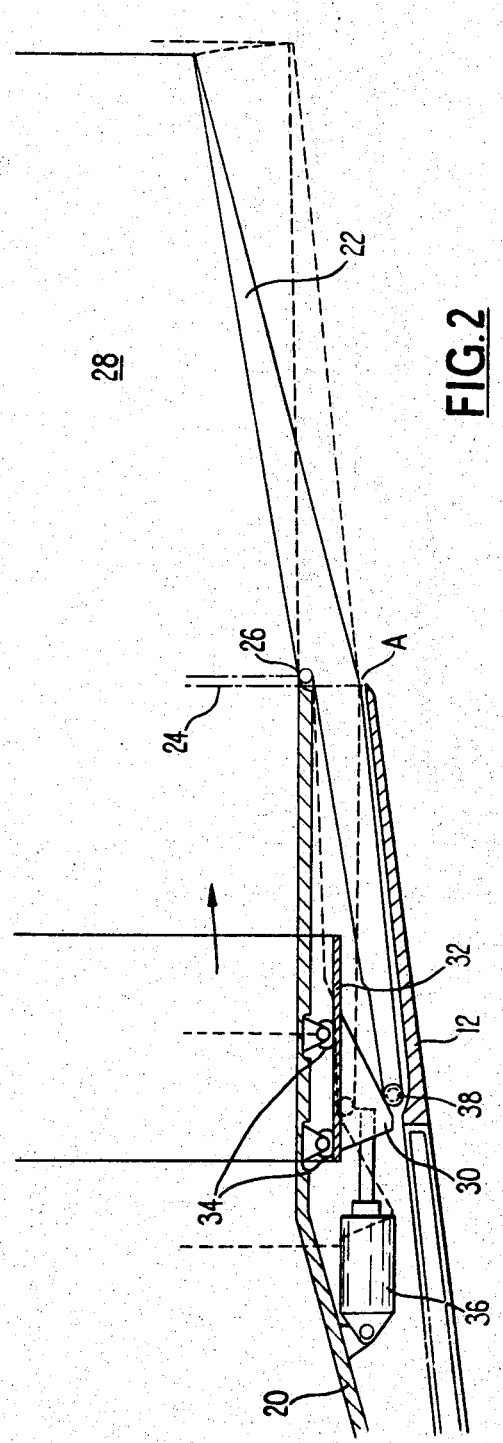
FIG. 2 is an enlarged view of the downstream end of FIG. 1.

In FIG. 2 the invention can be seen more clearly than in FIG. 1 and there is shown the downstream end of pod 12, the downstream end of jet pipe 20 and flaps one of which is shown at 22 which of course, constitute the variable-area nozzle.

Flaps 22 are hinged at 26 to the extreme end of jet pipe 20 in such a manner that their inner surfaces, along with the inner surface of jet pipe 20, form a substantially smooth-surfaced passage 28 for the flow of exhaust gases therethrough. Furthermore, the downstream ends of both the jet pipe 20 and pod 12 are adapted to be substantially coplanar so that the advantages of the jet pipe being provided with a substantially continuous flow path for the gas flow, is shared by the engine pod, when regarding the flow of ambient air thereover, for the arrangement substantially obviates may tendency for ambient air flowing over the pod, to break away therefrom at that point 'A' where pod 12 ends and flaps 20 project therefrom, when flaps 20 are pivoted or rocked to the position shown in full lines and wherein the flaps create the worst condition obtainable regarding the change in direction of the combined pod and flap profile. In order to enhance this advantage, the downstream end of pod 12 is formed close to the outer surfaces of flaps 20 so that, substantially no step is created between pod 12 and flaps 20.

The hinging of flaps 20 enables the outlet area of the nozzle to be varied by rocking the flaps about the hinge axes and means are provided to cause the said rocking, which means comprises a plurality of triangular cams 30 arranged equiangularly around jet pipe 20 upstream of the downstream end thereof. Cams 30 are rigidly mounted on a cylindrical carrier 32 which in turn is mounted for axial translation on rollers 34. Pairs of these rollers are rotatably mounted on the outer surface of jet pipe 20, in equiangularly spaced relationship so as to maintain carrier 32 coaxial with jet pipe 20 and the carrier is translated axially of the jet pipe by the actuation of powered rams 36 or solenoids or the like.

Rollers 38 are rotatably mounted on the upstream ends of flaps 22 and are in rolling contact with cams 30 and thus substantially obviate the friction which would otherwise be generated between cams 30 and flaps 22 when the cams are translated along with carrier 32.

Flaps 22 are sealed to each other in such a manner (not shown) that though they are separate movable members substantially no exhaust gas can leak between adjacent flaps. The sealing could comprise adapting the flaps to overlap each other in sliding engagement. Alternatively, separate inserts could be used, each insert penetrating adjacent edges of adjacent flaps in sliding engagement therein. A further alternative could be for each flap to have a tongue on one edge and the adjacent edge of the adjacent flaps have a groove, so as to receive the tongue in sliding engagement.

Thus, in operation, if the nozzle outlet area is required to be reduced, the rams would be actuated so as to translate the carrier 32, in a downstream direction. The sloping surfaces of cams 30 will push on the undersides of rollers 38 and rock flaps 22 about the axes of their hinges 26 so that the downstream ends of the flaps move toward the center of the nozzle and thus reduce the area.

If the nozzle outlet area is required to be increased, then rams 36 would be actuated so as to translate cams 30 in an upstream direction, thus removing the mechanical loading from the rollers 38 on flaps 22. The loads exerted on the inner surfaces of flaps 22 by the exhaust gases flowing through the nozzle, would then rock the downstream ends of flaps 22 outwards and so achieve the area increase.

A further advantage of the present invention is derived from the fact that the actuating and translating equipment is all shielded from the direct heat of the hot exhaust gases. Furthermore, if it is desired to provide a flow of cool air over the equipment as well as the shielding, means, such as vents, which may be closable, may be provided so as to permit entry of ambient air to the space wherein the equipment is placed, or air may be bled from the compressor for the same purpose.

It will be appreciated by those skilled in the art that this invention may be applied to circular or rectangular nozzles.

The drawings show the invention as applied to a nozzle which is convergent in all positions. However, the invention could be applied to a convergent-divergent nozzle, the only requirement being a change in the axial profile of flaps 22.

What we claim is:

1. A gas turbine engine having a jet pipe provided with a downstream end on which are hinged a plurality of circumferentially overlapping flaps, said engine being enclosed within a pod having a downstream end which is substantially coplanar with said jet pipe downstream end and adjacent said flap hinge axes, each flap having a portion extending upstream of its respective hinge, movable cam means being provided to operate on said portion of each flap to pivot each flap about its hinge axis, each of said flaps having inner and outer surfaces, said flaps being mounted so that said inner surfaces thereof will form a substantially continuous inner flow surface with said downstream end of said jet pipe and said outer surface thereof will form a substantially continuous flow surface with said downstream end of said pod for every position of each of said flaps.

* * * * *